United States Patent
Wang et al.

(10) Patent No.: US 11,270,108 B2
(45) Date of Patent: Mar. 8, 2022

(54) OBJECT TRACKING METHOD AND APPARATUS

(71) Applicant: CANON KABUSHIKI KAISHA, Tokyo (JP)

(72) Inventors: Shiting Wang, Beijing (CN); Qi Hu, Beijing (CN); Dongchao Wen, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 16/399,173

(22) Filed: Apr. 30, 2019

(65) Prior Publication Data

US 2019/0340431 A1 Nov. 7, 2019

(30) Foreign Application Priority Data

May 4, 2018 (CN) .......................... 201810418076.4

(51) Int. Cl.
*G06K 9/00* (2006.01)
(52) U.S. Cl.
CPC ................................ *G06K 9/00536* (2013.01)
(58) Field of Classification Search
CPC .................................................. G06K 9/00536
See application file for complete search history.

(56) References Cited

U.S. PATENT DOCUMENTS

| 8,599,267 B2* | 12/2013 | Kuwano | ................ H04N 7/185 |
| | | | 348/169 |
| 2005/0105764 A1* | 5/2005 | Han | ....................... H04N 7/188 |
| | | | 382/100 |
| 2014/0064558 A1* | 3/2014 | Huang | ..................... G06T 7/248 |
| | | | 382/103 |
| 2014/0072175 A1* | 3/2014 | Hasler | ..................... G06T 7/292 |
| | | | 382/103 |
| 2015/0365662 A1* | 12/2015 | Liao | ....................... H04N 19/89 |
| | | | 382/275 |

(Continued)

FOREIGN PATENT DOCUMENTS

| JP | 2011118782 A | 6/2011 |
| JP | 2012003720 A | 1/2012 |

(Continued)

OTHER PUBLICATIONS

Hiroki Nishino, et al., Automatic Moving Persons Detection in Lecture Scene, Technical Report of The Institute of Electronics, Information and Communication Engineers(IEICE), Jul. 2013, pp. 47-52, vol. 113, No. 166.

*Primary Examiner* — Santiago Garcia
(74) *Attorney, Agent, or Firm* — Canon U.S.A., Inc. IP Division

(57) ABSTRACT

An object tracking apparatus for a sequence of images, wherein a plurality of tracks have been obtained for the sequence of images, and each of the plurality of tracks is obtained by detecting an object in several images included in the sequence of images. The apparatus comprises matching track pair determining unit configured to determine a matching track pair from the plurality of tracks, wherein the matching track pair comprise a previous track and a subsequent track which correspond to the same object and are discontinuous, and combining unit configured to combine the previous track and the subsequent track included in the matching track pair.

12 Claims, 12 Drawing Sheets

(56) References Cited

U.S. PATENT DOCUMENTS

| | | | |
|---|---|---|---|
| 2016/0012301 A1* | 1/2016 | Arndt | G06K 9/00805 |
| | | | 382/104 |
| 2017/0154212 A1* | 6/2017 | Feris | G06T 7/13 |
| 2018/0039867 A1* | 2/2018 | Cheng | G06K 9/00677 |
| 2018/0089512 A1* | 3/2018 | Traff | H04N 5/23251 |
| 2018/0220939 A1* | 8/2018 | Matsuo | A61B 5/02416 |
| 2019/0244026 A1* | 8/2019 | Blott | H04N 5/247 |
| 2020/0012865 A1* | 1/2020 | Tao | G06T 7/248 |
| 2020/0334466 A1* | 10/2020 | Zhou | G06K 9/6282 |

FOREIGN PATENT DOCUMENTS

| | | |
|---|---|---|
| JP | 2013196029 A | 9/2013 |
| JP | 2017010224 A | 1/2017 |

\* cited by examiner

OBJECT TRACKING METHOD AND APPARATUS

CROSS-REFERENCE TO RELATED APPLICATIONS

This application claims the benefit of Chinese Patent Application No. 201810418076.4, filed May 4, 2018, which is hereby incorporated by reference herein in its entirety.

FIELD OF THE INVENTION

This invention relates to object tracking, and particularly relates to object tracking in video tracking.

BACKGROUND OF THE INVENTION

Video tracking is commonly used to identify a target object in a plurality of images over a period of time. In video tracking, an object in each image is to be detected to obtain detection results for the target object and then the detection results are combined to obtain tracking for the target object. Usually, during detection, an object would be assigned an ID and detection results for the object with the same ID can be used to obtain a track for the object.

In recent years, tracking has been important for various applications, such as surveillance analysis, action recognition, etc. In such tracking scenarios, it is noteworthy that the same person shall be always assigned the same ID, and if the same person is given different IDs, it may cause misunderstanding of analysis for the person's behaviour and the track for the person may be lost.

Furthermore, most current techniques associate a detection result for an object in one image with previous tracks to update the previous tracks, and such association always relies on object's appearance or position in images. However, when the object's appearance or position suddenly changes, it is possible that such object gets lost, and the previous track would be terminated and removed. For example, when a person suddenly changes their posture or moving direction in images, the appearance or position may change a lot so that the person gets lost. What's more, the person may even get tracked as another person with a different ID because the former track has been terminated and removed.

Therefore, there still needs improvement for object tracking.

SUMMARY OF THE INVENTION

The present disclosure is proposed in view of the technical issues in the prior art and provides an improved object tracking technique.

The present disclosure proposes an improved object tracking by means of track-track association. In principle, track-track association compares two tracks on multiple images, that is, for a track on multiple images, the present disclosure associates objects on multiple images other than an object on one image to it, bringing higher accuracy and robustness.

In one aspect, the present disclosure provides an object tracking apparatus for a sequence of images, wherein a plurality of tracks have been obtained for the sequence of images, and each of the plurality of tracks is obtained by detecting an object in several images included in the sequence of images. The apparatus comprises matching track pair determining unit configured to determine a matching track pair from the plurality of tracks, wherein the matching track pair comprise a previous track and a subsequent track which correspond to the same object and are discontinuous, and combining unit configured to combine the previous track and the subsequent track included in the matching track pair.

In another aspect, the present disclosure provides an object tracking method for a sequence of images, wherein a plurality of tracks have been obtained for the sequence of images, and each of the plurality of tracks is obtained by detecting an object in several images included in the sequence of images. The method comprises matching track pair determining step for determining a matching track pair from the plurality of tracks, wherein the matching track pair comprise a previous track and a subsequent track which correspond to the same object and are discontinuous, and combining step for combining the previous track and the subsequent track included in the matching track pair.

Further characteristic features and advantages of the present invention will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention, without limitation. In the figures, similar reference numerals are used for denoting similar items.

DESCRIPTION OF THE EMBODIMENTS

Example possible embodiments, which relate to object detection and tracking, are described herein. In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

In most tracking systems, association between object detection results on an image and tracks is a key step. Successful association can assign object detection results to their corresponding right tracks to avoid people identification change. A conventional tracking solution has been disclosed in a US Patent Application No. US20050105764A1, titled as "Video surveillance system with connection probability computation that is a function of object size", which is hereby incorporated herein as a whole by reference.

Figure 1:
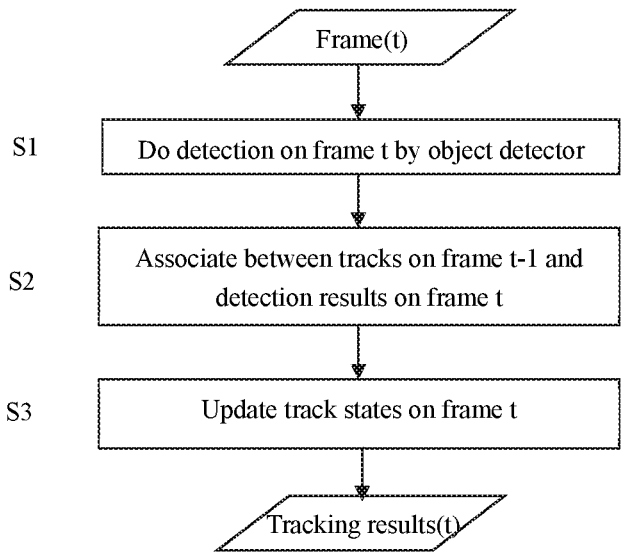
FIG. 1 illustrates an object detection and tracking process in the prior art.

FIG. 1 is a flowchart illustrating an object detection and tracking process of the prior art, which utilizes a so-called track-detection result association scheme.

As shown in FIG. 1, for a new image(t), the tracking would be performed based on a track which has been obtained on the previous t−1 images and the detection result on the new image(t). Firstly, in a step S1, object detection results for the image(t) are obtained by an object detector, then, association between tracks on previous images t−1 and detections results on image(t) is performed, as in step S2. To do association, the process calculates the connection probability of an object detection result-track pair. Each detection result and track pair comprises a particular one of detected objects and a particular existing track on last image(t−1). Connection probability is a function of object velocity and image patch similarity. Third, as in step S3, tracks can be merged, split or terminated based on the detection-track pair connection result on each image and track states can be updated accordingly. Then the tracking results until the image(t) can be obtained.

A main problem of this process in the prior art is that continuous association failure between detections and tracks may lead to a terminated track, thus the same person, even detected again, will be aligned with a different ID, and the object track cannot be accurately executed.

Hereinafter such problem is clearly described with reference to FIG. 2, which illustrates an example of person's motion in a convenience store.

Figure 2:
FIG. 2 illustrates an example of person in a convenience store.

As shown in FIG. 2, a person walks in a convenience store. The tracking system firstly detects the person and creates a track for him. After successful association in certain consecutive images, the track is assigned with tracking ID 0. But when the person bends before a shelf to fetch an item, he loses his tracking for more than several consecutive images. The track with ID 0 is terminated and removed from track list. At last, he is treated as a totally new person with ID 1 when he walks away. However, for the same person, ID changes from 0 to 1, and it is difficult to analyse the person's whole activity and even his interests for goods.

For such case, there may mainly exist three reasons:

1) Because the person's pose may change a lot, the detector fails to detect the person because hard posture is rare in training samples. And the association algorithm performs poorly as well due to appearance dissimilarity.

2) Because motion direction changes a lot, the person's search region in the image may drift so that detector may find nothing in the search region, or detect another person.

3) In the prior art, after the person loses his tracking in certain consecutive images, the former track would be terminated and removed. However, terminating a track too early will be hard to find a person back.

To solve the above problem, the present disclosure provides an improved object tracking by means of track-track association. The track-track association particularly can find a lost/terminated track back and thus can achieve higher accuracy object tracking.

More specifically, in the present disclosure, for a previous track which, in the prior art, is intended to be terminated due to object detection losing in certain images and deemed as a lost track, such track would be assigned as a pending state and be hold a duration time, instead of being removed, and then such pending track would be combined with a newly generated track. In operation, the pending track is compared with a newly generated track to determine whether they belong to the same person. In case they match with each other, that is they belong to the same person, the two tracks are connected, thus tracking results and track states are revised. The comparison can be based on track similarity, which can be measured by combining appearance, time, position, motion information or by other manners.

Figure 3:
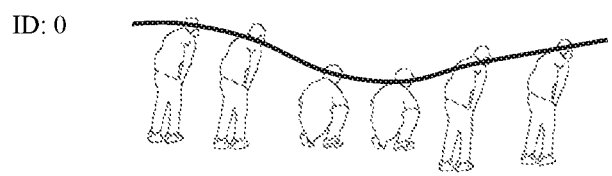
FIG. 3 schematically illustrates a tracking effect example of the present disclosure.

FIG. 3 illustrates a tracking effect example of the present disclosure. As shown in FIG. 3, compared with FIG. 2, in present disclosure, the tracking system can handle transient broken tracks, even when large posture/motion change happens.

Such assignation of pending state can avoid some tracks to be terminated too fast, so that more effective information can be recovered and more accurate tracking result can be obtained. Thereby, human ID change can be reduced even when people have large deformations. For example, a missing person can be re-tracked with the same ID after a few images. And the present disclosure can achieve more comprehensive and accurate tracking for an object.

The present disclosure relates to object detection and tracking, and it is not limited to a single object, but also is suitable for multi-object detection and tracking. The object can be any moveable things, such as a person, a moving animal, vehicle, etc. The present disclosure will be useful in an application scene wherein many objects/people exists, and particularly suitable for a shopping scene, where customers have large deformations to fetch items, as well as similar scenes. As for application environment, the present disclosure is suitable for offline video processing, or output with a delay for online processing.

Hereinafter the embodiments of the present disclosure will be described in detail. Note that in the context of the description, "image" means an image can be in any appropriate form, such as image frame in a video, etc, and thus to some degree, "image" can be exchangeable with "frame", "image frame".

According to some embodiments, the present disclosure provides an object tracking apparatus for a sequence of images, wherein a plurality of tracks have been obtained for the sequence of images, and each of the plurality of tracks is obtained by detecting an object in several images included in the sequence of images.

Figure 4:
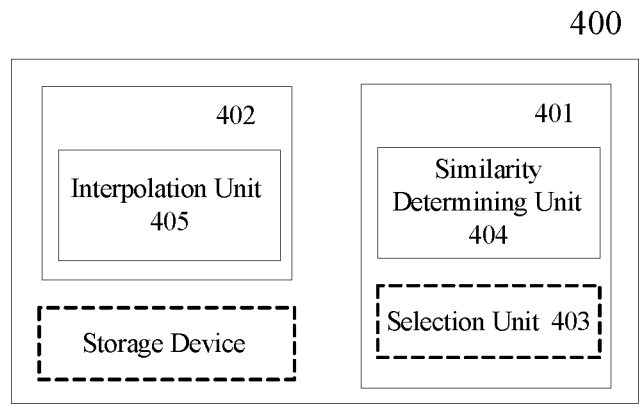
FIG. 4 illustrates a schematic block view of an object tracking apparatus according to the present disclosure.

FIG. 4 illustrates a schematic block of the apparatus according to the embodiments of the present disclosure. As shown in FIG. 4, the apparatus 400 comprises a matching track pair determining unit 401 configured to determine a matching track pair from the plurality of tracks, wherein the matching track pair comprise a previous track and a subsequent track which correspond to the same object and are discontinuous, and a combining unit 402 configured to combine the previous track and the subsequent track included in the matching track pair.

The matching track pair unit 401 and a combining unit 402 can be implemented in a variety of manners, such as software modules, hardware component, firmware, etc., as long as they can achieve the function as described.

Furthermore, the apparatus 400 further can include a storage device for storing any previous track and detection results for objects on any number of images, where the tracks can be stored along with its corresponding images, particularly its start image and last image, as well as corresponding object regions on the images. Furthermore, the stored tracks can be assigned a corresponding index for easy retrieval and pairing, and the stored tracks can be further assigned corresponding states, which will be described in detail hereinafter. Note that such storage device can alternatively be located outside of the apparatus 400.

Each of the plurality of tracks is obtained by detecting an object in several images included in the sequence of images, for example, for an object, a corresponding track can be obtained by connecting the object regions on the images related to the object, such as center of the object region or other particular point of the object region. Such several images can be consecutive images so that the track is generated by detecting object regions on consecutive images and connecting the object detection results, as that in the prior art described above, and alternatively, such several images can be discrete images so that in addition to object detection on the discrete images, object regions on images between neighboring discrete images can be interpolated by means of the object results on the discrete images or previous track and subsequent object result, and then the track can be generated based on the object regions on the discrete images as well as the newly interpolated object regions. The interpolation can be implemented by a variety of manners in the art and thus its detail description is omitted here.

Figure 5:
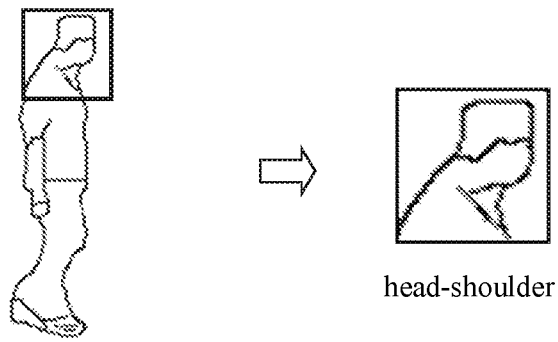
FIG. 5 illustrates an exemplary head-shoulder region as an object region.

For object detection in an image, a representative part of the object can be utilized as an object region for detection. Taking a person as an example, a human head-shoulder can be taken as the detection object, as shown in FIG. 5. Other object or object region can also be used, such as face region. Such object region can be detected by means of a variety of techniques, and for example, an object detector can be sliding-window based or feature-based, etc.

Since an image sequence is usually ordered in time, the tracks correspond to the image sequence and also can be ordered in time, and a track which is earlier in time can be referred to as a previous track and a track which is latter in time can be referred to as a subsequent track. A previous track and a subsequent track usually are separate from each other, and usually there exists at least one images between them on which the detection results are not associated with the two tracks. Alternatively, such previous track and subsequent track can coexist on some image frames, but due to some reasons, such as identity switch, etc, such two tracks are broken and separate from each other on such image frames.

Figure 6:
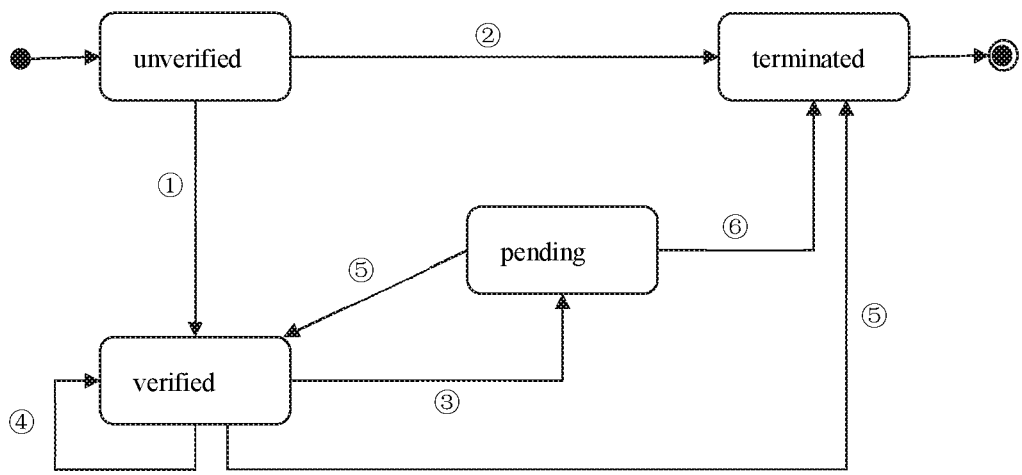
FIG. 6 illustrates categories of the tracks according to the present disclosure.

According to some embodiment, the plurality of tracks obtained from the image sequence can be stored in a track list and their states can be managed by means of a track state management as shown in FIG. 6.

Tracks are managed according to their states. There are mainly four states: unverified, verified, pending and terminated. States are transmitted according to association results between tracks and detection results. Terminated tracks will be finally removed from a track processing list. Tracks with other states are kept in the track processing list.

As illustrated in FIG. 6, for an image to be detected, if a detection result can't be successfully associated with previous tracks, a new track (i.e. a detection result in current image) in unverified state will be created. That is, an unverified track is a track in which the object associated with the track has been detected in consecutive images processed prior to the current image less than or equal to T1 consecutive image frames, such as a newly detected object. If the object associated with the same track for more than T1 times (Rule ①), the track turns from unverified to verified. The threshold T1 can help to reduce false positives in detection or re-identification to avoid being mistaken as a verified track. For example, given a 25 fps video, T1=4.

More specifically, when a new object is firstly detected in an image frame, a new track is created for such object and can be assigned as unverified state, and then only if such object can be detected in T1 consecutive image frames, such track can be transformed to a verified state.

Otherwise, the track will become a terminated track. If a track keeps unverified for at least one image (Rule ②), it will be transmitted from unverified to terminated, and then get removed from the track list. Usually, T0=1. That is, starting from a track becomes unverified state, if the object related to the track cannot be detected in T0 consecutive image frames, such track will be deemed as unstable, and will be terminated and removed.

When a verified track fails to be associated for consecutive T2 images (Rule ③), instead of immediately terminating the track as that in the prior art, we label the track in pending state. For example, given a 25 fps video, T2=4. Otherwise, if a track in verified state is still associated (Rule ④), the track keeps verified.

If the pending track can be associated with the newly verified track in T3 images (Rule ⑤), the newly verified track is set to terminated state and is deleted from the track list, while the pending track is transmitted to verified again during updating of the tracks. If the pending track cannot be associated with any newly verified track in T3 images (Rule ⑥), the pending track is set to terminated and removed from the track list. Considering that terminating a track too late may cause associating object detection to a wrong track, due to the similar appearance of two different people, here given a 25 fps video, we take T3=100.

In contrast with the prior art, our track association process adds a pending state to avoid association-failed track from being terminated too early, and then tries to find the person back for the pending track. By means of usage of the pending state, in addition to the association between object detections and tracks in prior art, the present disclosure does track-track association. In operation, a newly verified track and a pending track is selected as a track pair in input track list, and then the track-track association is performed for the track pair to determine whether it belongs to a matching track pair, which also can be referred to as a matching track pair determination.

In the context of the present disclosure, a previous track can be a pending track and a subsequent track can be a subsequent verified track. As an embodiment, a previous track is a track which have been generated based on previous image frames, but its last frame has been not associated with any detection result in at least a predetermined time (duration time), i.e, on at least a predetermined number of image frames, which means that the previous track has been holding at a pending state in at least a duration time, and a subsequent track is a track newly generated in the predetermined time, i.e., starting from any image included in the predetermined number of image frames. For example, a previous track can be always hold until all image frames are detected. As another example, a previous track can be hold at a pending state in a duration time, and if at such duration time, no new verified track is generated, the previous track would be terminated and removed. As yet another example, if in the duration time, a track is newly generated, even it is an unverified track, the previous track would be holding at pending state, such newly generated track would be traced and if such track becomes a verified track, it may become a subsequent track and form a track pair with the previous track.

According to the present disclosure, the matching track pair determination can be performed in a variety of manners. According to an embodiment, such determination can be performed at a predetermined interval of time. More specifically, every predetermined time, such determination can be performed for a plurality of tracks which are exists, and a pair of tracks are to be determined whether they match with each other. Then the states of the tracks can be updated. Since a sequence of image is usually ordered in time, such predetermined time may also correspond to a predetermined number of images, such as the T3 images as described above. Furthermore, in consideration of track states as described above, such pair of tracks for matching determination consist of a pending track (previous track) and a newly verified track (subsequent track).

In operation, it firstly checks whether there are both a pending track and a newly verified track in track list. If so, randomly or orderly choose a pending track and a newly verified track. For example, since tracks are added into the track list by time, take the first pending track and the last newly verified track in the track list. It may help to save the oldest pending track from being terminated. If this track pair fails, take the second last newly verified track in the track list with the pending track as another track pair. If the track pair is successfully matched, connected and updated, then repeat selecting track pairs until no such track pair exists.

According to another embodiment, such determination can trigger by a state change of the tracks. For example, such determination can be performed once a verified track newly generated occurs. More specifically, when a track is newly generated and verified, such newly generated track will try to associate with previous pending tracks to find whether there exists a previous track matches with the newly generated track, and then based on the result, the states of the tracks can be updated adaptively.

Furthermore, some selection rules can be applied as filter to accelerate the processing speed.

According to an embodiment, the apparatus 400 of the present disclosure may further include a selection unit 403 configured to select at least one track pair from the plurality of tracks, wherein each of the at least one track pair comprises a previous track and a subsequent track which are discontinuous and have an interval less than a predefined threshold therebetween, and wherein the matching track pair are determined from the at least one track pair.

Where, the interval between a previous and subsequent track means the number of the images between the previous track and the subsequent track, and particularly means the number of the images between the last image of the previous track and the start image of the subsequent track, which can be measured by the index difference between such two images since the images of sequence are ordered in time. The predefined threshold may be set in consideration of the processing accuracy and delay. The predefined threshold is larger, more pending tracks needs to be stored and the processing delay may be relative large. The predefined threshold is smaller, the tracks can be more accurately and rapidly updated. For example, the predefined threshold may less than or equal to the above described predetermined interval for determination, or the duration time or predetermined number of image frames for holding pending state for the previous track.

In such a case, the selection rule means the interval between two tracks. By means of such selection, such matching track pair determination can be not performed for all the existing tracks, but for at least one track pair each of which may include two tracks neighboring to each other, such two tracks having large possibility of being the same person. Wherein neighboring means that the absolute image index difference between the newly verified track's start image and the pending track's last image is under a predetermined threshold, such as 100 images. This indicates that the previous track should not be broken for a long time. Thereby, the processing efficiency of such determination can be further improved, while the accuracy is substantially not influenced. As an example, the pending tracks which are not selected will be set as terminated and removed since it means that such tracks have been broken a too long time and usually is lost.

With respect to a case that the determination is performed once a new track is generated and verified, a pending state of a track can be hold for a predetermined number of images, and if a new verified track is generated during the predetermined number of images, the newly verified track can try to be combined with the previously verified track to determine whether they match, and from this point, the predetermined number of images can be considered as the threshold for selecting track pairs, and the newly verified track and the previous verified track can be deemed as a track pair whose interval is less than the predetermined threshold.

According to another embodiment, another rule related to object size about tracking can be utilized. More specifically, the rule is that if object size difference of two tracks is less than a predetermined ratio A. For example, for a person to be tracked, a head-should rectangle of the person represents an object region for detection, and the size of head-should rectangle can indicate the object size, such as the area, the side length, etc of the rectangle. As an example, the head-shoulder rectangle width and height difference can be compared separately, and both length difference divided by width or height should be smaller than $\Delta$. In this embodiment, we require a selected track pair to satisfy this rule. Here we set $\Delta$ to 0.4.

Note that other kinds of rules can be utilized instead of being limited to the above, as long as the number of track pairs for matching determination can be appropriately reduced and the processing burden can be reduced.

The selection unit 403 can be implemented in a variety of manners, such as software modules, hardware component, firmware, etc., as long as they can achieve the function as described. Such selection unit can be included in the matching pair determination unit 401, and as an alternative, such selection unit can be located outside of the matching pair determination unit 401, and even outside of the object tracking apparatus.

In the present disclosure, whether two tracks match with each other can be determined by means of track similarity between the two tracks. From at least one track pairs, a track pair with the highest track similarity beyond a predefined threshold is regarded as matching. That is, they belong to the same person.

According to embodiments of the present disclosure, the matching track pair determining unit can comprise similarity determining unit 404 configured to determine object similarity between a previous track and a subsequent track to determine whether the previous track and the subsequent track match with each other.

The object similarity of two tracks can be determined in a variety of manners. For example, the similarity of two tracks is measured by combining all the time, motion and feature information. According to an embodiment, the object similarity of two tracks can mean similarity of object regions of the two tracks.

According to some embodiments, the similarity determining unit can be configured to determine object similarity between an object region from a previous track and a corresponding object region from a subsequent track to determine whether the previous track and the subsequent track match with each other. For an object region of a track, the corresponding object region of the other track may mean an object region included the other track on an image corresponding to the image on which the object region of the track is located, or an object region included in or predicted from the other track on an image which is the same as the image on which the object region of the track is located. Other kind of correspondence may be utilized, depending on the manner of determination of similarity.

For example, since for an object, at most a pair of tracks can match, a track pair with a track similarity beyond a predefined threshold can be regarded as a candidate matching pair, and the track pair with the highest track similarity in the candidate matching pairs can be deemed as the final matching track pair.

According to some embodiments, the object similarity comprises at least one of appearance similarity and motion similarity for an object. The similarity can be determined based on each of the motion similarity and appearance similarity, preferably only the motion similarity, or both of the motion and the appearance similarity. In the latter, preferably, motion similarity determination can be performed firstly and then appearance similarity is performed, and when both similarity is satisfied, the two tracks can be determined as matching. Of course, such order can be reversed.

According to an embodiment, the appearance similarity can be measured by one of color histogram distance, texture distance, etc., between an object region from the previous track and an object region from the subsequent track, for example, an object region from the previous track on an end image and an object region from the subsequent track on a corresponding end image. The color histogram difference can be determined by the Chi-square distance of two rectangles' color histograms. The texture difference can be determined by the Bhattacharyya distance of two rectangles' LBP histograms. If the normalized similarity is more than a predetermined threshold (for example, 0.6), track A and B can be deemed as matched.

The end image of the previous track can be last image of the previous track and the corresponding end image of the subsequent track can be the start image of the subsequent track.

According to some embodiments, the motion similarity can be measured based on overlap ratio between an object region from the previous track and an object region from the subsequent track on at least one specific image.

Note that the specific image actually means that a specific image on which the pervious and subsequent tracks can obtain object regions, and even if a track does not include such specific image, an object region can be predicted for the track on the specific image. According to an embodiment, at least one of the previous track and the subsequent track does not include the specific image, and wherein the object region on the specific image from one of the previous track and the subsequent track which does not include the specific image is a predicted object region predicted on the specific image by following the one track.

Figure 7A:
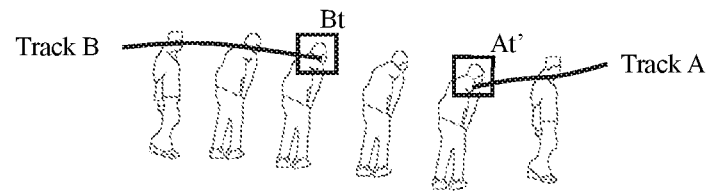
FIGS. 7A and 7B illustrate an exemplary object region prediction of the present disclosure.

The prediction can be achieved in a variety of manners, such as following the track to predict, also be referred as motion estimation. FIG. 7 schematically illustrates object region predication, wherein as shown in FIG. 7A, Track A starts from Image t' and the corresponding object region is At', and Track A can be deemed as a subsequent track, and Track B ends at Image t and the object region is Bt, and Track B can be deemed as a previous track, and the Image t' is selected as the specific image.

The predication can be done by calculating the average speed of the track B on last S images, usually we take S=10. If track B is shorter than S, take the whole track B images. The predicted rectangle Bt' as the predicted object region is calculated by the following formula:

$$\text{Position}_{B_{t'}} = \text{Postion}_{B_t} + \text{speed} * \text{timeDiff}$$

Figure 7B:
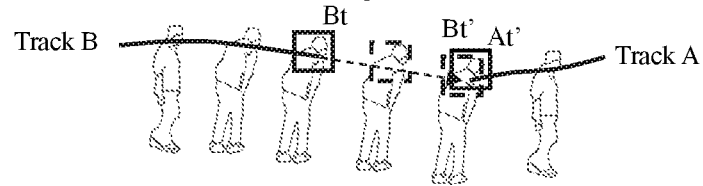

Wherein, $\text{Position}_{B_t}$ is the center of object region $B_t$ of track B on image t, and the timeDiff is the difference between index difference of image t and image t'. Such predicted object region is shown in FIG. 7B.

Figure 8:
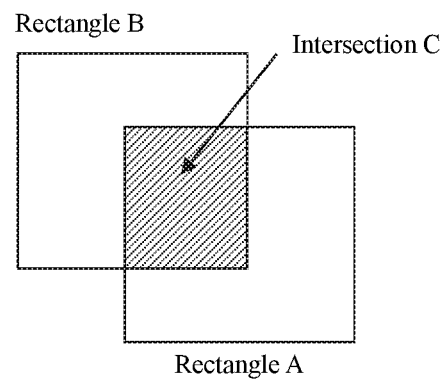
FIG. 8 illustrates an exemplary overlapping ratio calculation of the present disclosure.

Here the overlap ratio is defined as two rectangles' intersection over union, as shown in FIG. 8, where such rectangles mean object region on the same one specific image, such as head-shoulder rectangle for a person.

$$\text{Union} = \text{rectangle } B + \text{rectangle } A - \text{intersection } C$$

$$\text{Overlap ratio} = \frac{C}{A+B-C}.$$

If such overlap ration is larger than or equal to a predetermined threshold, such as 0.7, such two tracks can be deemed as matched.

Or, the motion similarity is measured by the position difference between such two rectangles' centers characterized by Euclidean distance, and if their center position differences divided by width/height respectively are both less than another predetermined threshold (for example, 0.5), track A and B are deemed as matching.

Note that for motion similarity determination, object regions from the two tracks usually are located in the same image, and thus for a track which does not include the image, its object region on the image shall be predicted, such as described above.

According to some embodiments, the specific image is an end image of either of the previous track and subsequent track. In such a case, the similarity determination unit can be configured to determine the motion similarity based on an overlapping ratio between the object region on the specific image of one of the previous track and the subsequent track including the specific image and a predicted object region of the other track on the specific image which is predicted following the other track.

According to some embodiments, the at least one specific image are at least one interval images between the previous track and subsequent track. In such a case, the similarity determination unit can be configured to determine the motion similarity based on overlapping ratios between the object regions of the previous and subsequent tracks on each of the at least one interval images. Where, the at least one interval images can exist on at least one of the previous track and subsequent track, or the at least one interval images can exist on none of the previous track and subsequent track, and wherein an object region of each of the previous and subsequent track on an interval image is a predicted object region which is predicted following the track, as described above.

According to an embodiment, the motion similarity is measured by a ratio between the number of overlapping images among the at least one interval images and the number of the interval images, and wherein an overlapping image means an image on which the overlapping ratio of object regions from the previous and subsequent track is larger than a predetermined threshold, which may be the predetermined threshold as described with reference to FIG. 8.

According to an embodiment, the motion similarity can be measured by a statistic value of overlap ratios between object regions for the previous track and the subsequent track on each of the at least one interval images, such as average value, mean value, middle value, etc. For example, the statistic value can be obtained from the overlapping ratios of interval images on which the overlapping ratio is higher than the predetermined threshold.

After a matching track pair is determined, two tracks included in the pair will be combined/connected and the tracks can be updated. In the track list, the pending track (the previous track) is extended by the newly verified track (subsequent track) and is transmitted to verified again, and the newly verified track is set to terminated state and is deleted from the track list.

According to an embodiment, the combining unit comprises interpolating unit 405 configured to interpolate at least object regions on missing images between the previous track and the subsequent track based on at least one of the previous track and the subsequent track to obtain object tracking information, so as to combine the previous track and the subsequent track. The missing images may mean images which are between respective end images of the two tracks while being included in none of the two tracks.

Note that such interpolation actually may mean for images between the two tracks, object region on each of such images would be interpolated based on either track, and then the interpolated object regions would be connected and then connected with the existing tracks, so that the two tracks are combined with each other. According to other embodiments, in addition to the interval images, some other images on the existing tracks can be modified according to the tracks so as to make the updated track more accuracy.

Note that such interpolation can be performed in a variety of manner. As an example, such interpolation can be performed similarly with the prediction as described above. For example, a proper interpolation algorithm is the simple bi-linear interpolation algorithm.

According to an embodiment, the combining unit can comprise interpolating unit configured to interpolate at least object regions on missing images between the previous track and the subsequent track based on an end image of one of the previous and subsequent track and the other track of which does not include the end image to obtain object tracking information, so as to combine the previous track and the subsequent track. For example, when the start image of the subsequent track is utilized as an end image for similarity determination, the missing images may be interpolated from the start image and the previous track.

According to an embodiment, the combining unit comprises interpolating unit configured to interpolate at least object regions on missing images between the previous track and the subsequent track based on one image of at least one interval images between the previous and subsequent track as well as the previous and subsequent, so as to combine the previous track and the subsequent track. Where, the one image is an image on which the overlap ratio between object regions of the previous track and the subsequent track is largest.

As an example, we regard the overlapped rectangles with the highest overlapping ratio as reliable positions. In contrast, the low overlap ratio rectangles on interval images are not reliable and are deleted. Thus taking reliable positions together with existing tracking positions of the two tracks, we can re-predict positions by motion estimation again for those unreliable positions. In this way, the position is more precise.

The similarity determination unit 404 and interpolation unit 405 can be implemented in a variety of manners, such as software modules, hardware component, firmware, etc., as long as they can achieve the function as described.

Figure 9:
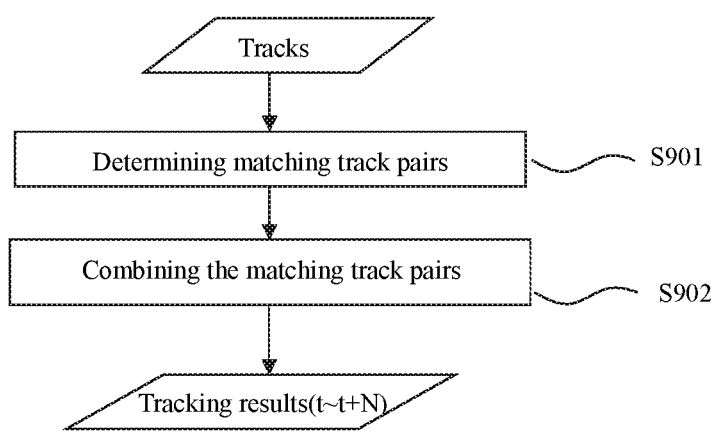
FIG. 9 illustrates an object tracking method according to the present disclosure.

According to embodiments of the present disclosure, there provides an object tracking method for a sequence of images, wherein a plurality of tracks have been obtained for the sequence of images, and each of the plurality of tracks is obtained by detecting an object in several images included in the sequence of images. FIG. 9 illustrates a flowchart of the method according to the present disclosure.

In step S901 (hereinafter referred to as determining step), a matching track pair is determined from the plurality of tracks, wherein the matching track pair comprise a previous track and a subsequent track which correspond to the same object and are discontinuous.

Then, in step S902 (hereinafter referred to as combining step), the previous track and the subsequent track included in the matching track pair are combined.

Preferably, the determining step can comprises selecting step for selecting at least one track pair from the plurality of tracks, wherein each of the at least one track pair comprises a previous track and a subsequent track which are discontinuous and have an interval less than a predefined threshold therebetween, and wherein the matching track pair are determined from the at least one track pair.

Preferably, the determining step can comprise similarity determining step for determining object similarity between a previous track and a subsequent track to determine whether the previous track and the subsequent track match with each other.

Preferably, in the similarity determining step, object similarity between an object region from a previous track and a corresponding object region from a subsequent track can be determined to determine whether the previous track and the subsequent track match with each other.

Preferably, the object similarity can comprise at least one of appearance similarity and motion similarity for an object. In view of this, the appearance similarity can be measured by one of color histogram distance, texture distance between an object region from the previous track on an end image and an object region from the subsequent track on a corresponding end image. Furthermore, the motion similarity can be measured based on overlap ratio between an object region from the previous track and an object region from the subsequent track on at least one specific image.

Preferably, the specific image can be an end image of either of the previous track and subsequent track, and in the similarity determination step, the motion similarity can be determined based on an overlapping ratio between the object region on the specific image of one of the previous track and the subsequent track including the specific image and a predicted object region of the other track on the specific frame which is predicted following the other track.

Preferably, the at least one specific image can beat least one interval images between the previous track and subsequent track, and in the similarity determination step, the motion similarity can be determined based on a ratio between the number of overlapping images among the at least one interval images and the number of the interval images, and wherein an overlapping image means an image on which the overlapping ratio of object regions from the previous and subsequent track is larger than a second predetermined threshold.

Preferably, the at least one interval images can exist on both the previous track and subsequent track. In addition, or alternatively, the at least one interval images can exist on none of the previous track and subsequent track, and wherein an object region of each of the previous and subsequent track on an interval image can be a predicted object region which is predicted following the track.

Preferably, the combining step can comprise interpolating step for interpolating at least object regions on missing images between the previous track and the subsequent track based on at least one of the previous track and the subsequent track to obtain object tracking information, so as to combine the previous track and the subsequent track.

Preferably, the combining step can comprise interpolating step for interpolating at least object regions on missing images between the previous track and the subsequent track based on an end image of one of the previous and subsequent track and the other track of which does not include the end image to obtain object tracking information, so as to combine the previous track and the subsequent track.

Preferably, the combining step can comprise interpolating step for interpolating at least object regions on missing images between the previous track and the subsequent track based on one image of at least one interval images between the previous and subsequent track as well as the previous and subsequent, so as to combine the previous track and the subsequent track, wherein the one image is an image on which the overlap ratio between object regions of the previous track and the subsequent track is largest.

Thanks to the connection between to-be-terminated track and newly verified track, object ID switch is reduced. The tracking accuracy is also improved, because the missing/conflicting positions on images are complemented by interpolation. The track is continuous other than fragmented. Besides, the interpolation is more precise by combining reliable positions and existing positions.

Although the present disclosure outputs all tracking results on last N images when performing track-track association on current N images. The running speed is not affected much. In other words, the present disclosure is both suitable for offline video analysis applications, and online applications which can tolerate a few seconds delay of display.

Hereinafter, some exemplary embodiments of the present disclosure will be described in detail.

First Exemplary Embodiment

This first exemplary embodiment of the present disclosure will be described with reference to the figures hereinafter.

The first exemplary embodiment of the present disclosure mainly relates to an object detection and tracking process in a so-called uni-directional track-track association model, where particularly, for two tracks for matching determination and association, the specific image will be located in one track, so that an object region on the specific image will be predicted for the other track not including the specific image and then the similarity determination and association will be performed on this basis. Since such case is similar with a case that one track extends towards to the other track, it is also called as an uni-directional track-track association. Note that the first exemplary embodiment of the present disclosure is particularly suitable for relative small object deformation between images in the sequence, such as relative small posture/motion change of a person in the images.

Figure 10:
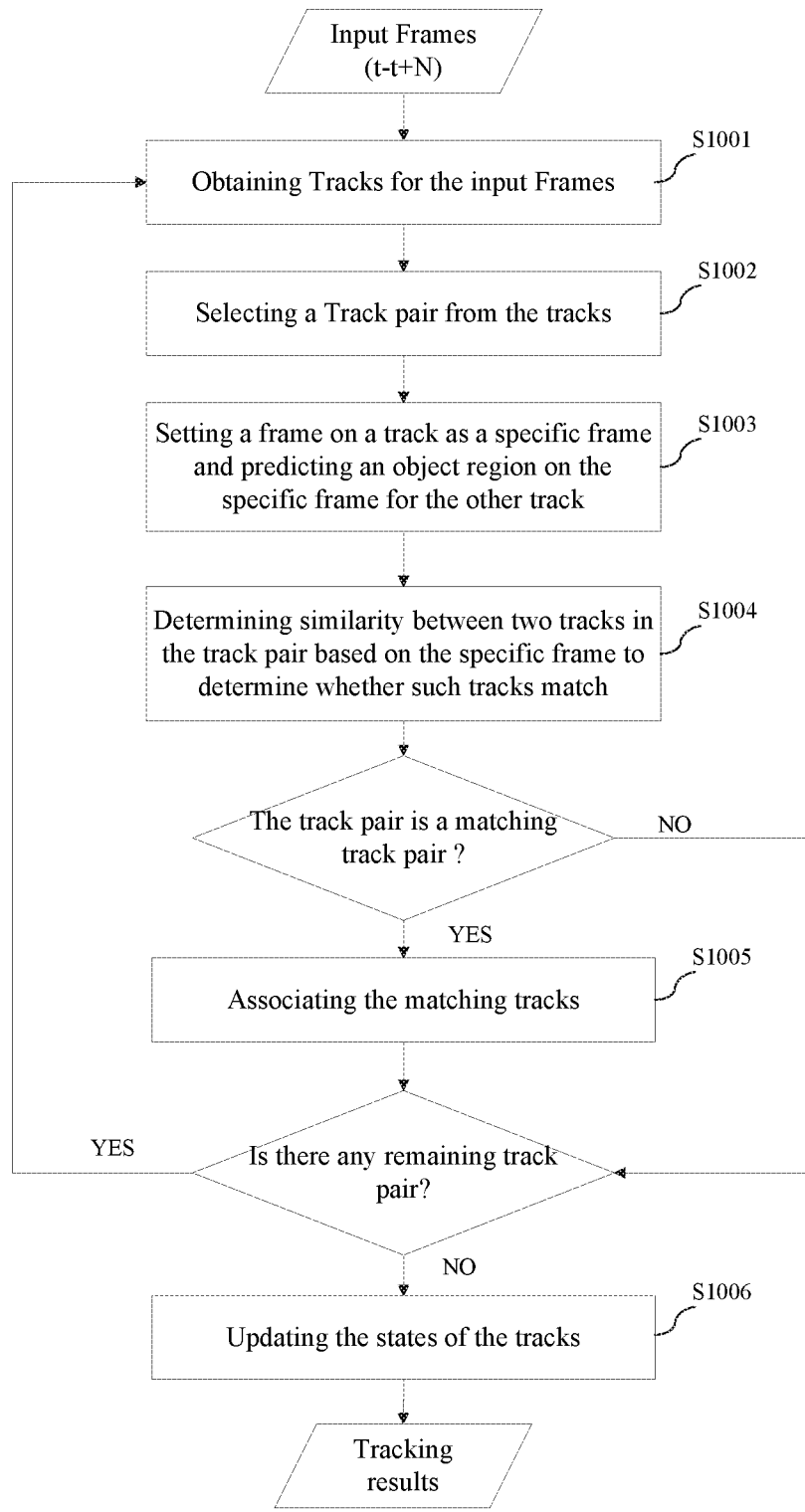
FIG. 10 illustrates a flowchart of the object tracking method according to the first exemplary embodiment of the present disclosure.

FIG. 10 illustrates a flowchart of the object tracking process of the first exemplary embodiment.

Firstly, a plurality of images which are input from a video or image sequences, whose image index are from t to t+N. Images can be totally decompressed to RGB images from the input video. Of course, the images can be other format. Images t~t+N are loaded into processing memory. In our embodiment, N is 200 images. In the process, for each image t', detection of objects on the image is performed by an object detector and detection results are generated. Then tracks on last image t'-1 with the detection results on current image t' are combined, so that the tracks for the images can be obtained.

In step S1001, a plurality of tracks can be obtained for the input images. Such plurality of tracks can be obtained in variety of manners and stored in a track list. And for an image, the corresponding track, if any, can be generated by means of detection result-track association.

For an image t', the object on the image will be detected, and particularly by means of a detector. For example, when the object is a person, and the person will be detected by detecting head-should region of the person on the image via a corresponding detector.

Figure 11:
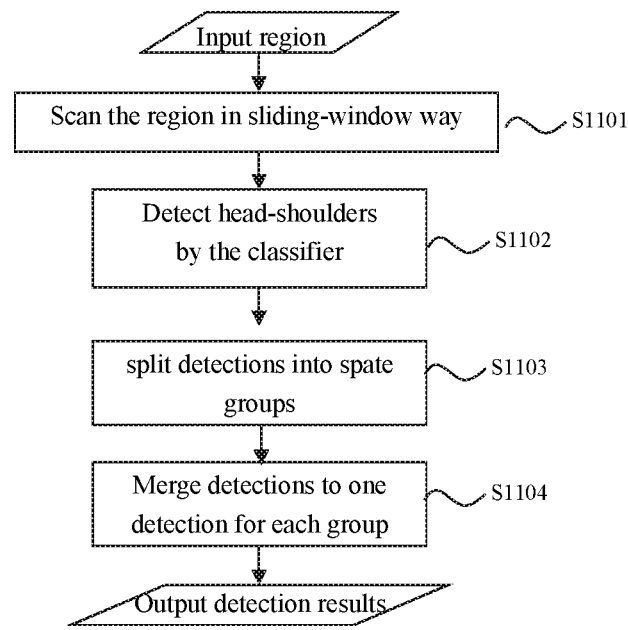
FIG. 11 illustrates a flowchart of sliding-window based detection.

The human detector can be sliding-window based or feature based, etc. FIG. 11 illustrates a flowchart of sliding-window based detector.

The detection process comprises the following steps: the first step S1101 is to use a scan window to scan over an exhaustive range of possible locations and scales in an image to obtain an object region, the second step S1102 is to detect the object region by using a corresponding classifier, for example, a head-shoulder classifier can be used for detecting a head-shoulder region of a person, and the third step S1103 is to split detections into separate groups according to positions and sizes. The final step S1104 is to merge the detection positions into a single detection position by averaging their similar locations and sizes for each detection group.

Figure 12:
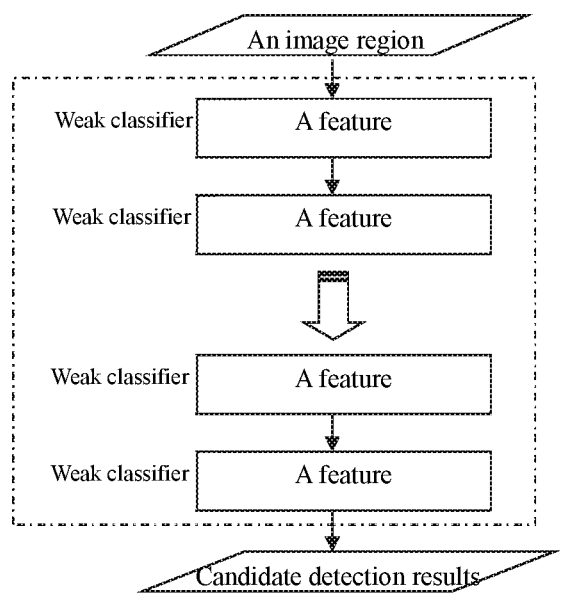
FIG. 12 illustrates an exemplary classifier.

The classifier can comprise a cascade of weak classifiers, as shown in FIG. 12. In this embodiment, we use HOG (Histogram of Oriented Gradient) feature and boosting algorithm to build classifiers. HOG features images are obtained by projecting each pixel's gradient magnitude into 8 orientations according to its gradient direction. The head-shoulder classifier is trained offline with hundreds of thousands of positive/negative training samples, which are normalized to the same size.

Figure 13:
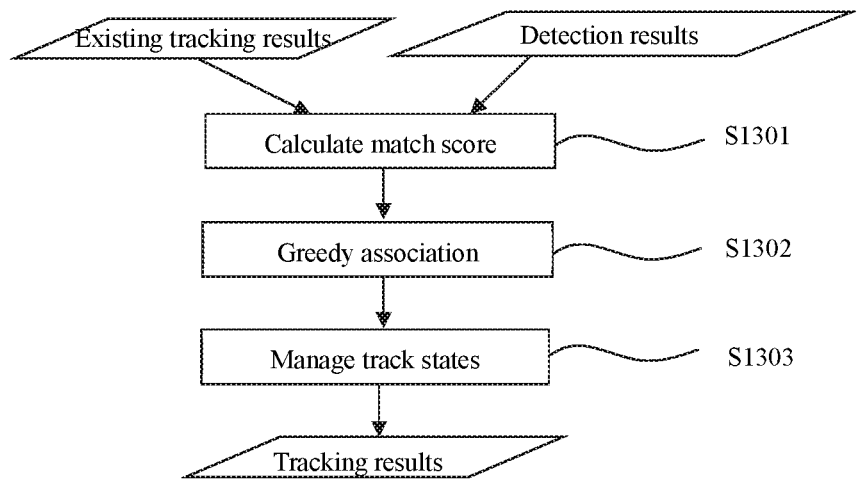
FIG. 13 is a flowchart of association between a detection-track pair.

FIG. 13 is a flowchart of association between detection result and track pair. Where, a matching-score function is defined, and association is executed by greedy algorithm until the matching score is below a certain threshold.

In step S1301, the matching score is the measure of two image patches' similarity. Crop one image patch from detection results of current image and crop another image patch from the newest positions of existing tracks to form an image patch pair. For each image patch pair, the matching score is calculated by a pixel-by-pixel template matching method or a color-histogram-based template matching method.

In step S1302, association will be found by a greedy algorithm. First we build a matrix, whose columns are matching score, track position and detection result position respectively, and each row is about an image patch pair. Then sort the matrix from high to low by matching score. The image patch pair with highest score in the matrix is considered as associated. Next, rows in conflict with the associated image patch pair are removed from the matrix immediately. We do the association in this process until all the scores are below an experimental threshold or the matrix is empty.

In step S1303, once the object-track association after object detection on an image is done, track states are updated for each image. After our track-track association on some images, the track state will be updated again.

In step S1002, a track pair are selected from the track list. As for selection of track pairs, it is checked whether there are both a pending track and a newly verified track in a track list. Track list is obtained on image t~t+N. If so, randomly or orderly choose a pending track as track B and a newly verified track as track A. For example, since tracks are added into the track list by time, take the first pending track and the last newly verified track in the track list. It may help to save the oldest pending track from being terminated. If this track pair do not match after the following process, take the second last newly verified track in the track list with the pending track as another track pair. If the track pair is successfully matched, connected and updated, then repeat selecting track pairs until no such track pair exists.

Furthermore, some selection rules can be applied as filter to accelerate the method's speed as above. For example, rules about tracking human head size can be set as above.

In step S1003, the end image of one of the two tracks is set as the specific image, and the object region on the specific image is predicted for the other track.

Usually, the start image of the newly generated track will be selected as the specific image for subsequent process, and such prediction can be performed as described above with reference to FIGS. 7A and 7B. Of course, other image can be selected as the specific image, such as the last image of the pending track, other images neighboring to the end image in the previous or subsequent track, etc.

In step S1004, similarity between such two object regions is determined. In this embodiment, the similarity determination can be based on the motion similarity, or based on both of the motion similarity and appearance similarity, and the latter would be more accurate.

Figure 14:
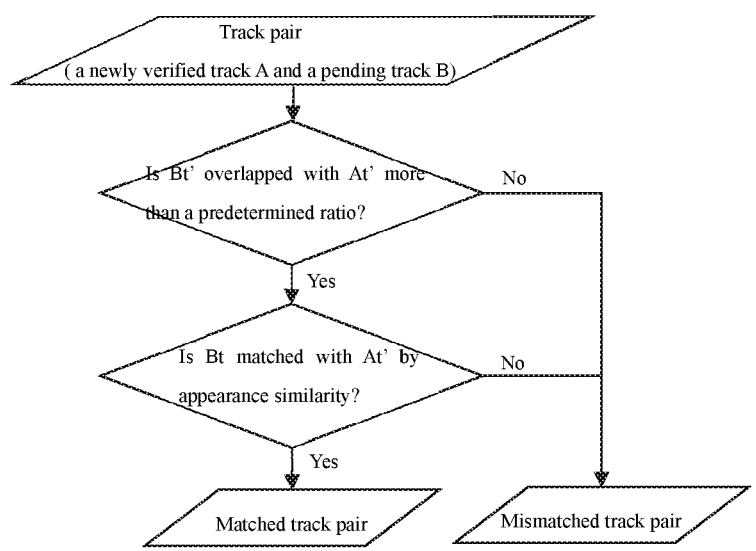
FIG. 14 illustrates exemplary similarity determination of the first embodiment of the present disclosure.

FIG. 14 illustrate a flowchart of similarity determination based on both of the motion similarity and appearance similarity.

For a newly verified track A and a pending track B for match determination as shown in FIGS. 7A and 7B, the start image t' of the newly verified track A is selected as the specific image, and object region At' and Bt from the tracks A and B on the specific image is determined. Specifically, for track B, a corresponding object region Bt' can be predicted on the specific image as described above.

In step 1401, calculate the overlap ratio of such two object regions on the specific image. If the overlap ratio is less than their corresponding predetermined threshold (for example, 0.7), track A and B are deemed as mismatched.

Otherwise, in step 1402, compare the object region Bt on the last image of track B and the object region At' on the start image of track A. If the normalized appearance similarity is more than a predetermined threshold (for example, 0.6), track A and B are deemed as matched. The flowchart above is recommended for computation efficiency in programming. Note that in other embodiments, step 901 and step 902 can be exchanged.

Note that if for a pending track, at least one newly verified track can be deemed as its matching track as described above, the track with the highest similarity value will be chosen as the final matching tack. For example, the similarity value can be calculated as weighting sum of the motion similarity and appearance similarity, and usually the motion similarity can be give a relative larger weight. Or simply, the matching new track with the higher overlapping ratio can be deemed as the final matching track to be further processed.

After a matching track pair is determined, two tracks included in the pair will be combined/connected to update the tracks.

In step S1005, the matching tracks can be combined/connected. For the unidirectional model in the present embodiment, interpolating positions by motion estimation is easy for missing tracking images, because motion/posture change isn't so large. A proper interpolating algorithm is the simple bi-linear interpolation algorithm. Note that in addition to objection regions on the frames between the two tracks are to be estimated, object regions on some images on the existing tracks may be adaptively modified so as to make the connected track more accurate. For example, the object regions on start image as well as its subsequent images of the subsequent track may be appropriately modified to revise the connected track.

Note that as an alternative, such association process can be performed when all matching pairs have been finally determined, and then for each matching pair, the tracks are matched and connected.

As an example, considering that for a pending track for an object, there may exist at least one candidate matching pairs, all candidate matching pairs can be firstly determined, and then from all candidate matching pairs, the final matching pairs can be selected as above, and then such association process can be performed for the final matching pairs, and then for each matching pair, the tracks are matched and connected.

Such processes in steps S1003-S1005 can be referred to as track association process, particularly uni-directional track association process. Any possible track pairs will be selected and processed.

Figure 15:
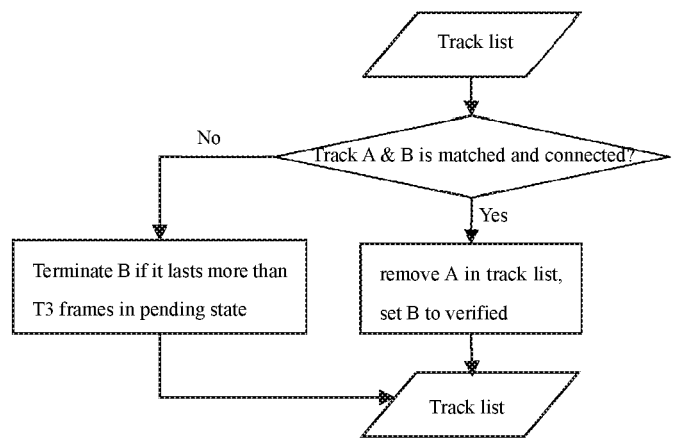
FIG. 15 illustrates updating of track states after association of tracks.

After the tracks are matched and connected, the states of the tracks will be updated. FIG. 15 illustrates a flowchart of updating states of the tracks.

As shown in FIG. 15, if the track A& B is matched and connected, remove the newly verified track A in track list. Note that track A's region in past images have already copied, modified and added to the pending track B, and the pending track B becomes a verified track.

Otherwise, if a track B is in pending state for T3 images, then the track B is labelled as terminated. And it is to be removed from the track list. Meaning that, we don't try to find the person associated with the track back any more.

Finally, output tracks in t~t+N as final tracking results.

Figure 16:
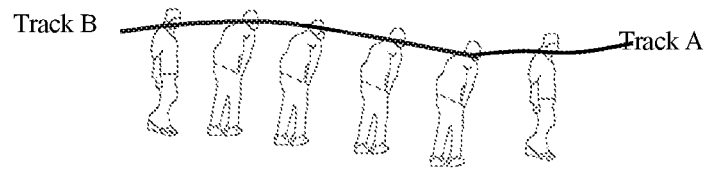
FIG. 16 illustrates the effect of the uni-directional track association of the present disclosure.

FIG. 16 illustrates the effect of the uni-directional track association of the present disclosure.

Second Exemplary Embodiment

This second exemplary embodiment of the present disclosure will be described with reference to the figures hereinafter.

The second exemplary embodiment of the present disclosure mainly relates to an object detection and tracking process in a so-called bi-directional track-track association model, where particularly, for two tracks for matching determination and association, the specific image will be the interval images between the two tracks, so that an object region on the specific image will be predicted for each track and then the similarity determination and association will be performed on this basis. Since such case is similar with a case that such two tracks both extend towards each other, it is also called as an bi-directional track-track association. Such bi-directional method is particularly suitable for a case that a large object deformation, such as motion/posture change, is occurred between two tracks, as shown in FIG. 18, or the two tracks is spaced by more images.

Figure 17:
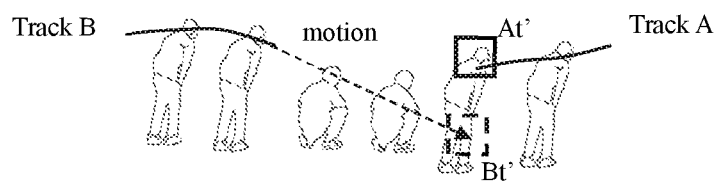
FIG. 17 illustrates a case for which the bi-directional track association of the second exemplary embodiment of the present disclosure is suitable.

As shown in FIG. 17, for a case that a large motion/posture change is occurred between two tracks, the bidirectional method is particularly suitable and can effectively handle it.

Figure 18:
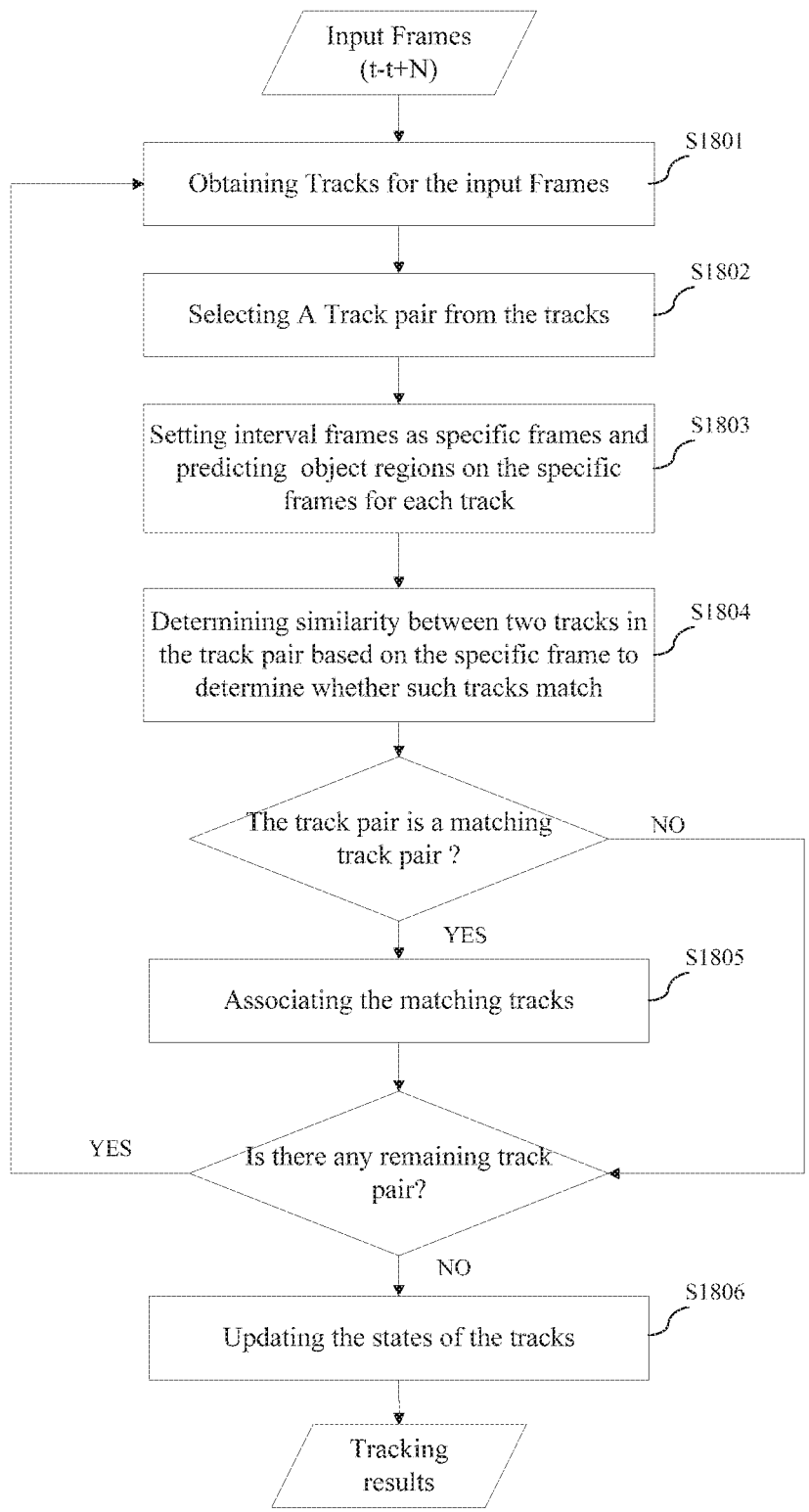
FIG. 18 illustrates a flowchart of the object tracking according to the second exemplary embodiment of the present disclosure.

FIG. 18 illustrates a flowchart of the association process of the second exemplary embodiment.

Step S1801 and S1802 can be performed similarly with the steps S1001 and S1002 in the first embodiment, and thus their detail description will be omitted here.

In Step 1803, the interval images between the two tracks can be set as specific images, and interval images are the images on which both the two tracks exist or do not exist. And for the images on which both tracks do not exist, we predict positions by motion estimation for interval images between such two tracks. For the previous track, the motion prediction direction is forward, while for the subsequent track, the motion prediction direction is backward.

Then, in step S1804, similarity between the predicted object regions for the two tracks are determined, where the overlapping ratio of the predicted object regions on the interval images can be calculated and used for similarity determination.

More specifically, an overlap image ratio between the interval images of two tracks are calculated.

In such a case, the overlapped image ratio is called bidirectional motion similarity, and for some case, such interval images still can include some images on which the tracks exist.

The overlapped-image ratio is defined as:

$$r = \frac{m}{n}$$

Wherein, n is the number of interval images between track A and B; m is the amount of overlapped rectangles of track A and track B. Two rectangles are deemed as overlapped if their intersection divided by union, as described above with reference to FIG. 8, is larger than or equal to a predetermined threshold (here we take 0.7), or their rectangle center distance divided by the large rectangle width is less than a predetermined threshold (here we take 0.5). The overlapped rectangles can be motion-predicted or actual rectangles in tracks.

As an example, simply, as long as there exists one interval image being deemed as overlapped as described above, such two tracks can be deemed as matching. As another example, if the overlapped image ratio is larger than or equal to a predetermined threshold R3 (here we take 0.6), the two tracks are deemed as matching.

Interval images are the images on which both tracks exist or non-exist. In some special cases, we expand the interval images to avoid the number of interval images too small. A simple way to expand is to add M images forward and backward outside the interval images, that is, M images on each of the tracks. For example, M=1.

Figure 19:
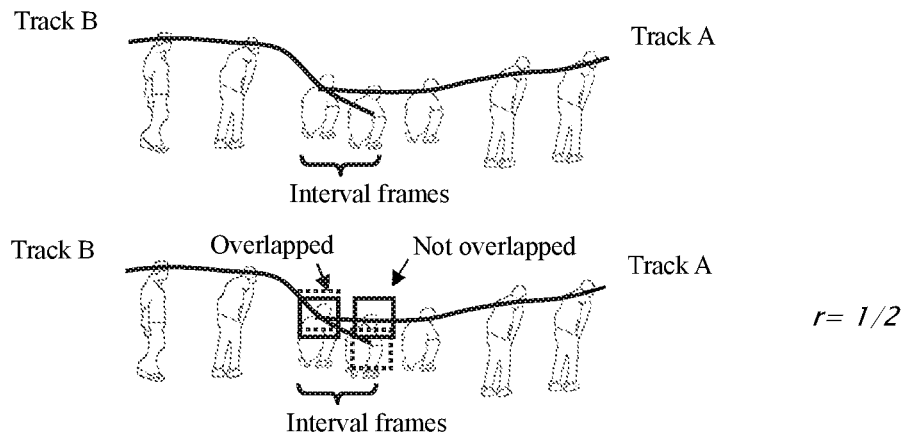
FIGS. 19 and 20 illustrate Bi-directional motion-predicted rectangles on interval images and the corresponding calculated overlap image ratio value.
Figure 20:
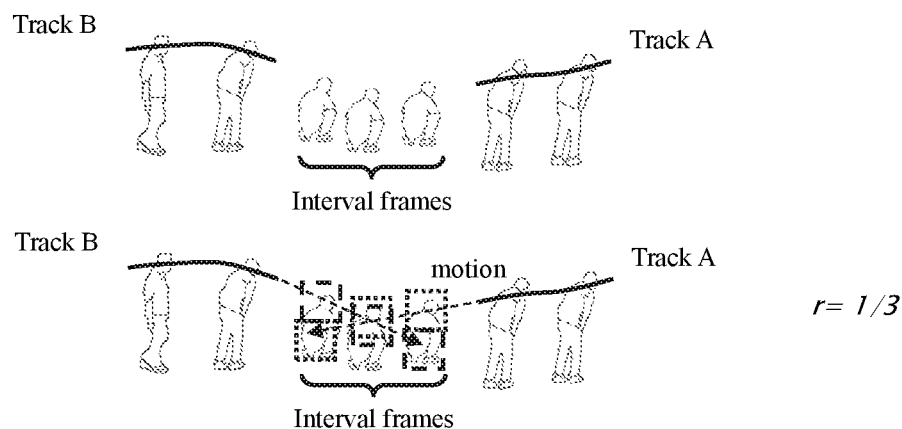
Figure 21:
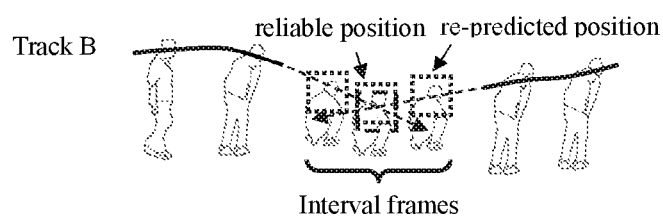
FIG. 21 is an example of re-predicting positions for interval images.

FIGS. 19 and 20 illustrates exemplary overlapping between the predicted object regions from the two tracks. As shown in FIG. 20, the image overlapping ratio is r=1/2, wherein the interval images are images on both the two tracks, and as shown in FIG. 21, the image overlapping ratio is r=1/3, wherein the interval images are images on none of the two tracks.

Note that if for a pending track, at least one newly verified track can be deemed as its candidate matching track as described above, the track pair with the highest similarity value will be chosen as the final matching track pair.

For example, the similarity value may the overlapping image ratio, that is, the track pair with largest overlapping image ratio will be deemed as the final matching track pair.

As another example, the motion similarity value of a track pair can be calculated as statistic value of the motion similarity of the overlapped images, and appearance similarity value of a track pair can be calculated as statistic value of the appearance similarity of the overlapped images, and then the similarity value can be calculated as weighting sum of the motion similarity value and appearance similarity value, and usually the motion similarity can be give a relative larger weight. Or simply, the matching track pair with the higher motion similarity value can be deemed as the final matching track pair.

In step 1805, association of the matching tracks are performed. For bi-directional method, we regard the overlapped motion-predicted rectangles as reliable positions, as shown in FIG. 21. In contrast, the low overlap ratio rectangles on interval images are not reliable and to be discarded. Thus taking reliable positions together with existing tracking positions of the two tracks, we can re-predict positions by motion estimation again for those unreliable positions. Motion estimation method can also be the simple bi-linear interpolation algorithm.

Similar with the step S1005 as described above, such association process in S1805 can be alternatively performed when all matching pairs have been finally determined, and then for each matching pair, the tracks are matched and connected. As a further alternative example, considering that for a pending track for an object, there may exist at least one candidate matching pairs, all candidate matching pairs can be firstly determined, and then from all candidate matching pairs, the final matching pairs can be selected as above, and then such association process can be performed for the final matching pairs, and then for each matching pair, the tracks are matched and connected.

Such processes in steps S1803-S1805 can be referred to as track association process, particularly bi-directional track association process.

In step S1806, the states of the tracks are updated, and such updating of the tracks can be similar with that in step S1006 of the first embodiment, and thus the description is omitted here.

Finally, output tracks in t~t+N as final tracking results.

Third Exemplary Embodiment

This third exemplary embodiment of the present disclosure will be described with reference to the figures hereinafter.

In the third exemplary embodiment, two kinds of association model as described in the first and second embodiments will be utilized together. More specifically, for a track pair, the above described uni-directional mode and bi-directional mode will be utilized together.

Figure 22:
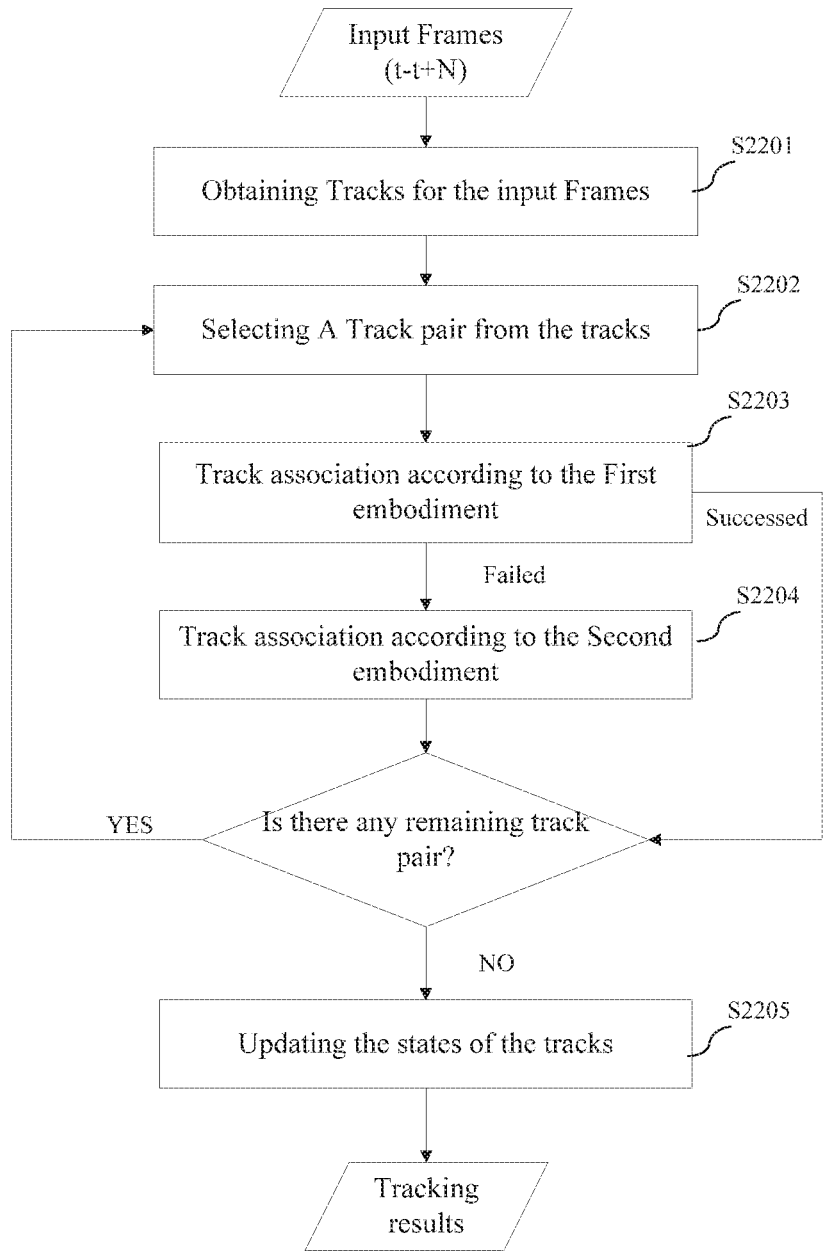
FIG. 22 illustrates a flowchart of the third exemplary embodiment of the present disclosure.

FIG. 22 illustrates a flowchart of the third embodiment of the present disclosure.

Step S2201 and S2202 can be performed similarly with the steps S1001 and S1002 in the first embodiment, and thus their detail description will be omitted here.

The process in step S2203 corresponds to the uni-directional track association process in the first embodiment, as described with reference to steps S1003 to S1005 in FIG. 10, and thus the detail description is omitted here.

If unidirectional association fails, then go to step S2204, the process in step S2204 corresponds to the bi-directional association process in the second embodiment, as described with reference to steps S1803 to S1805 in FIG. 18, and thus the detail description is omitted here.

If unidirectional method or bi-directional method successes, the two tracks are to be connected and output as the final tracking result for image t~t+N.

If both methods fail, the existing object track association result aren't changed and then outputted.

Alternative Exemplary Embodiment

In the above embodiments, for a plurality of images, such as image frames t~t+N, firstly tracks are obtained for such image frames t~t+N, and then the object tracking is mainly preformed for the obtained tracks.

As an alternative, in the present embodiment, the object tracking can be performed in a trigger mode. That is, once a verified track newly generated occurs, matching pair determination would be performed and then the tracks are associated and updated, if there exists matching. More specifically, when a new track is generated and then become verified while there exists a pending track, such newly generated track will try to associate with previous pending tracks to find whether there exists a previous track matches with the newly generated track, and then based on the result, the states of the tracks can be updated adaptively.

Figure 23:
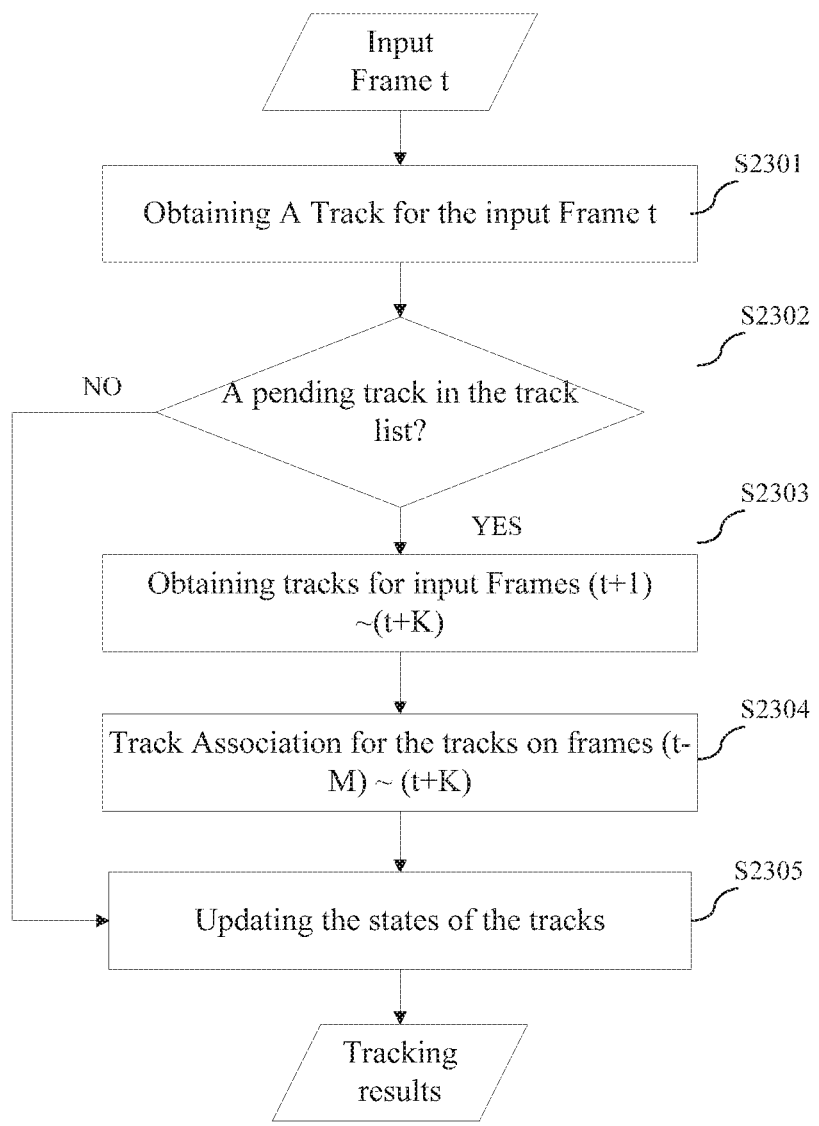
FIG. 23 illustrates a flowchart of an alternative embodiment of the present disclosure.

FIG. 23 illustrates a flowchart of the present embodiment according to the present disclosure. Firstly, input one or a plurality of images. The number of images loaded into memory doesn't matter.

For image t, in step S2301, detect on it and generate detection results by a detector. The process in such step is similar with that in the step S1001, and thus its detail description is omitted here.

Then in step S2303, it is determined whether there is a pending track. If no, directly output tracking results on image t. And the embodiment processes the next image t+1. However, if yes, in step S2303, we repeat the process in Step S2301 on image t+1 to t+K for image-by-image tracking. Then in step S2304 we do track-track association among current tracking results on images (t−M)~(t+K), and the process in S2304 may correspond to the previous uni-directional association process or bi-directional association process, and thus its detail description is omitted here. In this embodiment, we take 100 for M, K.

Then track states on images (t−M)~(t+K) is updated in step S2305, similar with that described above.

Finally, the tracking results on images (t−M)~(t+K) are modified and outputted.

This embodiment can take track-track association according to the present disclosure as an add-on process to the prior art. This embodiment can achieve less ID switch and higher accuracy.

Figure 24:
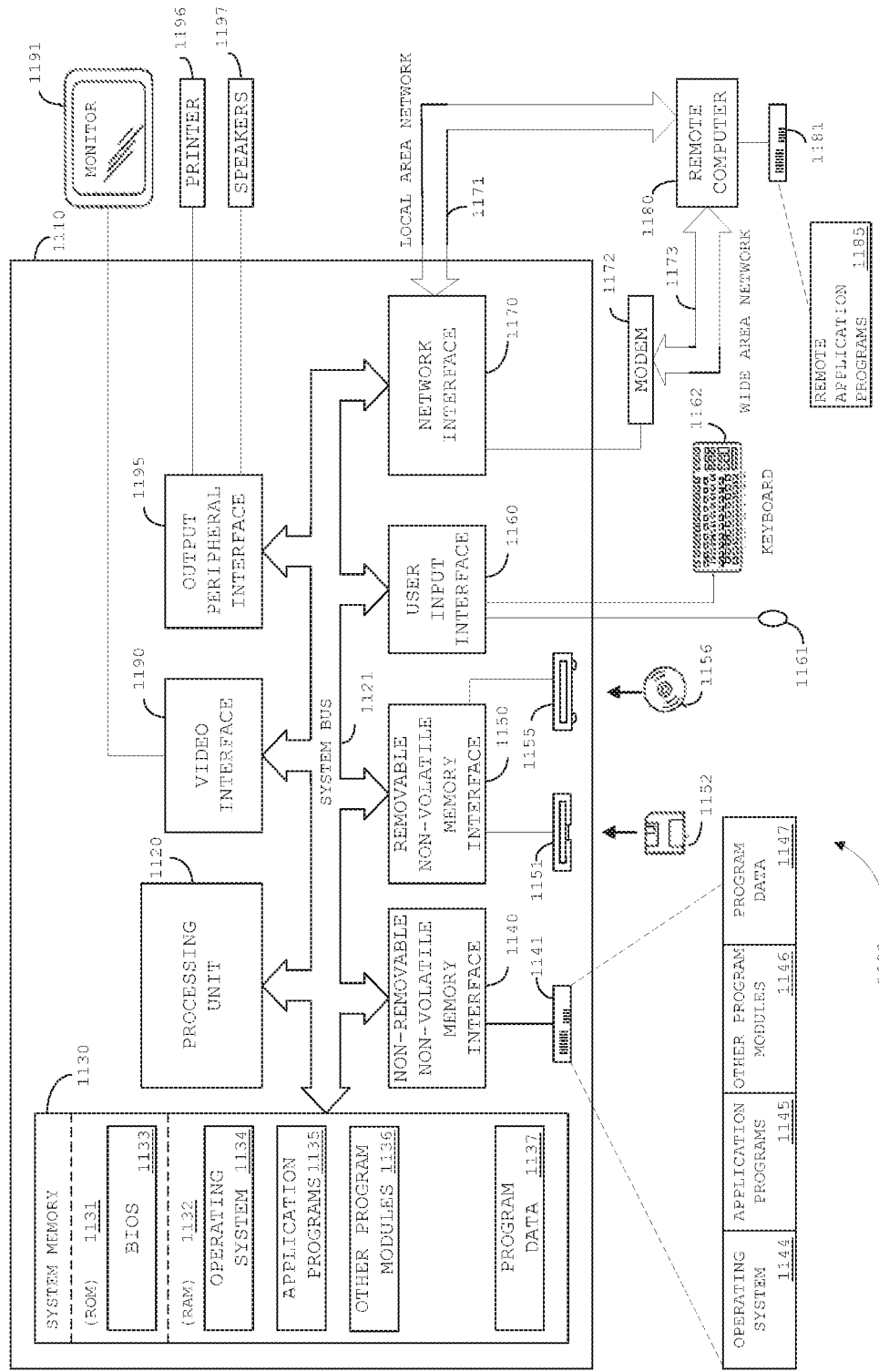
FIG. 24 is a block diagram illustrating an exemplary hardware configuration of a computer system which can implement the embodiments of the present disclosure.

FIG. 24 is a block diagram illustrating a hardware configuration of a computer system 1000 which can implement the embodiments of the present disclosure.

As shown in FIG. 24, the computer system comprises a computer 1110. The computer 1110 comprises a processing unit 1120, a system memory 1130, non-removable non-volatile memory interface 1140, removable non-volatile memory interface 1150, user input interface 1160, network interface 1170, video interface 1190 and output peripheral interface 1195, which are connected via a system bus 1121.

The system memory 1130 comprises ROM (read-only memory) 1131 and RAM (random access memory) 1132. A BIOS (basic input output system) 1133 resides in the ROM 1131. An operating system 1134, application programs 1135, other program modules 1136 and some program data 1137 reside in the RAM 1132.

A non-removable non-volatile memory 1141, such as a hard disk, is connected to the non-removable non-volatile memory interface 1140. The non-removable non-volatile memory 1141 can store an operating system 1144, application programs 1145, other program modules 1146 and some program data 1147, for example.

Removable non-volatile memories, such as a floppy drive 1151 and a CD-ROM drive 1155, are connected to the removable non-volatile memory interface 1150. For example, a floppy disk 1152 can be inserted into the floppy drive 1151, and a CD (compact disk) 1156 can be inserted into the CD-ROM drive 1155.

Input devices, such a mouse 1161 and a keyboard 1162, are connected to the user input interface 1160.

The computer 1110 can be connected to a remote computer 1180 by the network interface 1170. For example, the network interface 1170 can be connected to the remote computer 1180 via a local area network 1171. Alternatively, the network interface 1170 can be connected to a modem (modulator-demodulator) 1172, and the modem 1172 is connected to the remote computer 1180 via a wide area network 1173.

The remote computer 1180 may comprise a memory 1181, such as a hard disk, which stores remote application programs 1185.

The video interface 1190 is connected to a monitor 1191.

The output peripheral interface 1195 is connected to a printer 1196 and speakers 1197.

The computer system shown in FIG. 24 is merely illustrative and is in no way intended to limit the present disclosure, its application, or uses.

The computer system shown in FIG. 24 may be implemented to any of the embodiments, either as a stand-alone computer, or as a processing system in an apparatus, possibly with one or more unnecessary components removed or with one or more additional components added.

INDUSTRY APPLICABILITY

The present disclosure can be used in many applications. For example, the present disclosure could be used for detecting and tracking an object in a static image or a moving video captured by a camera, and especially advantageous for that in handheld devices equipped with cameras, mobile (camera-based).

Please note the method and apparatus described in the present specification can be implemented as software, firmware, hardware, or any combination thereof. Certain components may, for example, be implemented as software running on a digital signal processor or microprocessor. Other components may, for example, be implemented as hardware and/or application specific integrated circuit.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An object tracking apparatus comprising:
an acquiring unit configured to acquire a plurality of tracks having a sequence of several images from which an object is detected;
a selecting unit configured to select a first track and a second track from the plurality of tracks, an interval of the first track and the second track being less than a first predetermined threshold;
a prediction unit configured to predict an object region ahead of the second track or an object region predicted following the first track based on a speed of the first track or the second track;
a determining unit configured to determine whether a similarity between an end image in the first track and a start image in the second track is greater than a second predetermined threshold; and
a combining unit configured to combine, in a case where the similarity is greater than the second predetermined threshold, the first track and the second track by connecting the first track and the second track,
wherein the similarity is determined by either one of an overlap between an object region on the end image in the first track and the object region ahead of the second track or an overlap between an object region on the start image in the second track and the object region predicted following the first track.

2. The apparatus according to claim 1, wherein the similarity includes an object similarity between an object region from the first track and a corresponding object region from the second track.

3. The apparatus according to claim 2, wherein the object similarity comprises at least one of appearance similarity and motion similarity for an object.

4. The apparatus according to claim 3, wherein the at least one specific image are at least one interval images between the first track and the second track, and
wherein, the similarity is determined with the motion similarity based on a ratio between the number of overlapping images among the at least one interval images and the number of the interval images, and wherein an overlapping image means an image on which the overlapping ratio of object regions from the first track and the second track is larger than a second predetermined threshold.

5. The apparatus according to claim 4, wherein the at least one interval images exist on both the first track and the second track, or the at least one interval images exist on none of the first track and the second track, and wherein an object region of each of the first track and the second track on an interval image is a predicted object region which is predicted following the track.

6. The apparatus according to claim 1, further comprises:
an interpolating unit configured to interpolate at least object regions between the first track and the second track based on at least one of the first track and the second track to obtain object tracking information, wherein the similarity is determined by using the interpolated object region as the object region ahead of the second track or the object region predicted following the first track.

7. An object tracking method, the method comprising:
acquiring a plurality of tracks having a sequence of several images from which an object is detected;
selecting a first track and a second track from the plurality of tracks, an interval of the first track and the second track being less than a first predetermined threshold;
predicting an object region ahead of the second track or an object region predicted following the first track based on a speed of the first track or the second track;
determining whether a similarity between an end image in the first track and a start image in the second track is greater than a second predetermined threshold; and
combining, in a case where the similarity is greater than the second predetermined threshold, the first track and the second track by connecting the first track and the second track,
wherein the similarity is determined by either one of an overlap between an object region on the end image in the first track and the object region ahead of the second track or an overlap between an object region on the start image in the second track and the object region predicted following the first track.

8. A device, comprising:
at least one processor, and
at least one storage on which instructions are stored, the instructions, when executed, causing the at least one processor to perform an object tracking method, the method comprising:
acquiring a plurality of tracks having a sequence of several images from which an object is detected;
selecting a first track and a second track from the plurality of tracks, an interval of the first track and the second track being less than a first predetermined threshold;
predicting an object region ahead of the second track or an object region predicted following the first track based on a speed of the first track or the second track;
determining whether a similarity between an end image in the first track and a start image in the second track is greater than a second predetermined threshold; and
combining, in a case where the similarity is greater than the second predetermined threshold, the first track and the second track by connecting the first track and the second track,
wherein the similarity is determined by either one of an overlap between an object region on the end image in the first track and the object region ahead of the second track or an overlap between an object region on the start image in the second track and the object region predicted following the first track.

9. A non-transitory storage device on which instructions are stored, the instructions, when executed, causing at least one processor to perform the claim 7.

10. The apparatus according to claim 3, wherein the appearance similarity is measured by one of color histogram distance, texture distance between an object region from the end image in the first track and an object region from the start image in the second track.

11. The apparatus according to claim 3, wherein the motion similarity is measured based on overlap ratio between an object region from the first track and an object region from the second track on at least one specific image.

12. The apparatus according to claim 1, further comprising a prediction unit configured to predict the object region ahead of the second track or the object region predicted following the first track by calculating an average speed of the first track or an average speed of the second track.

* * * * *